United States Patent [19]

Colardelle et al.

[11] 3,886,322

[45] May 27, 1975

[54] FULL ELECTRONIC TWO-WIRE TO FOUR-WIRE CONVERSION CIRCUIT

[75] Inventors: Joël Serge Colardelle, Creteil; Pierre Girard, Paris; Claude Paul Henri Lerouge, Maurepas, all of France

[73] Assignee: International Standard Electric Corporation, New York, N.Y.

[22] Filed: Oct. 20, 1972

[21] Appl. No.: 299,385

[30] Foreign Application Priority Data

Oct. 20, 1971 France .............................. 71.37559

[52] U.S. Cl. .......................................... 179/170 NC

[51] Int. Cl. .............................................. H04b 1/58

[58] Field of Search .................... 179/170 NC, 81 A

[56] References Cited

UNITED STATES PATENTS

| | | | |
|---|---|---|---|
| 3,530,260 | 9/1970 | Gaunt, Jr. | 179/170 NC |
| 3,700,831 | 10/1972 | Aagard et al. | 179/170 NC |
| 3,714,381 | 1/1973 | Matsuda et al. | 179/170 NC |
| 3,748,399 | 7/1973 | Matsuda et al. | 179/170 NC |

*Primary Examiner*—Kathleen H. Claffy
*Assistant Examiner*—Mitchell Saffian
*Attorney, Agent, or Firm*—James B. Raden; Delbert P. Warner

[57] ABSTRACT

A circuit is disclosed for use in data switching wherein a two-wire to four-wire conversion ("hybrid" function) is performed by all-electronic means. These means comprise one complementary symmetry differential amplifier with emitter coupling per direction of transmission with adequate provision for minimizing interaction between both directions. Means are also provided for minimizing inter-line and inter-junctor crosstalk by supplying lines and junctors through active "gyrators" equivalent to series inductances.

6 Claims, 7 Drawing Figures

FULL ELECTRONIC TWO-WIRE TO FOUR-WIRE CONVERSION CIRCUIT

The present invention concerns a full-electronic two-wire to four-wire conversion circuit for a data switching center.

In the French Pat. No. 69 35622 (corresponding to U.S. Pat. No. 3,689,710) and the French Pat. Application No. 71 18151 filed on Oct. 17, 1969 and on May 19, 1971 and both entitled "Two-wire to four wire conversion circuit for a data switching center," there are described two-wire to four wire conversion circuits specially adapted for use in a switching stage equipped with electronic crosspoints the resistance of which is not negligible. This adaption has been obtained by using current modulation, as the value of a current is independent of resistor inserted in path. In the above-mentioned this patent and this patent application, the coupling of the two-wire line to the four-wire switching network is realized by means of a transformer achieving the insulation and the two-wire to four-wire conversion.

More precisely, the functions that such a two-wire to four-wire circuit must achieve are:

To insulate the subscriber's line from the switching network so that, a short-circuit on the line does not create any damage in the switching center;

To realize the conversion from a balanced transmission into an unbalanced transmission and the bidirectional transmission of the signals;

To allow a transmission of the information signals which is independent from the value of the switching circuit resistance;

To minimize the inter-line crosstalk, particularly the cross-talk due to couplings through the power supply.

The circuit object of the present invention achieves these different operations by full electronic means and avoids the use not only of an isolation transformer but also line decoupling inductances.

The object of the present invention is thus to realize a full electronic two-wire to four-wire circuit designed to couple two-wire subscriber's lines to a four-wire switching network.

Another object of the invention is to connect two subscriber's lines through the switching network and a junctor so that the electronic circuits located between the subscriber's lines appear as being completely transparent for the information signals.

According to a characteristic of the invention there are provided, in the conversion circuit, means to realize on one hand the two-wire to four-wire conversion and on the other hand the opposite conversion, said means comprising for each transmission direction of the information signals, a complementary differential amplifier with emitter feedback, means to establish a DC bias in each path assigned, in the switching network, to the transmission direction M (from the subscriber's line to the network) and to the transmission direction N (from the network to the line) and means to avoid crosstalk between the two transmission directions made up, said means comprising first a constant current generator placed in the path of the transmission direction M and, second a unique choice for the values of the resistors in said conversion circuit so that this circuit is equivalent to a hybrid transformer with a transformation ratio equal to one.

According to another characteristic of the invention, there are provided means for decoupling, in each conversion circuit and in each junctor, each power supply connection by an electronic dipole equivalent to an inductance, the internal resistance of said dipole becoming very high when the current which flows across it exceeds a preset value.

The above mentioned and other features and objects of this invention will become apparent by reference to the following description taken in conjunction with the accompanying drawings in which.

GENERAL DESCRIPTION

Figure 1:
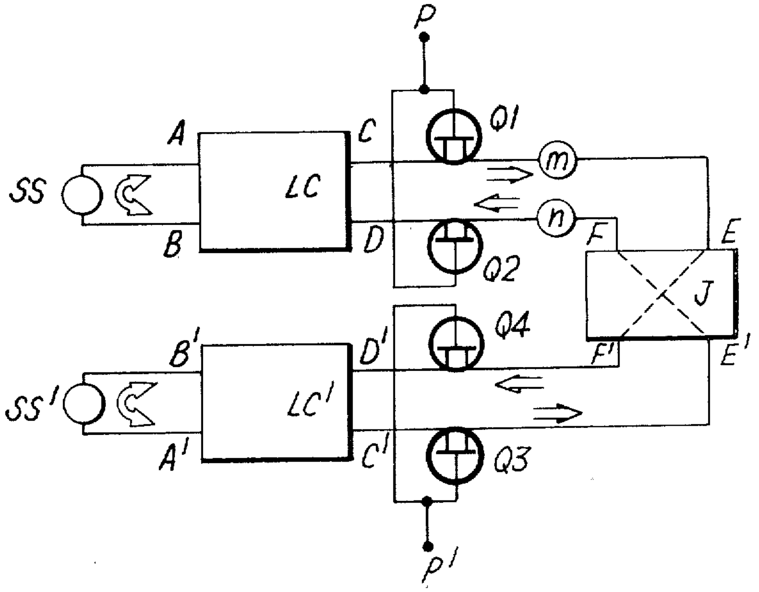
FIG. 1 represents the general diagram of a speech path.

FIG. 1 represents a general diagram of a path set to transmit information signals between two two-wire subscriber's lines A, B and A', E'; through a switching circuit comprising The subscriber's sets SS, SS';

The conversion circuits LC, LC';

The junctor J;

The unbalanced transmission paths C-E, D-F and C'-E', D'-F'.

Each path is set through selection stages with electronic cross-points.

By way of a non-limitative example, the crosspoints can be realized with MOS transistors such as described in the French Pat. No. 1,555,813 and in its fourth addition (Addition Certificate No. 69,44164). These transistors referenced Q1, Q2, Q3, Q4 are controlled by the application of signals P and P'.

A switching network generally comprises *n* selection stages and each transistor of the figure therefore symbolizes *n* MOS transistors connected in series which introduce a resistance of value Rds.

Figure 2:
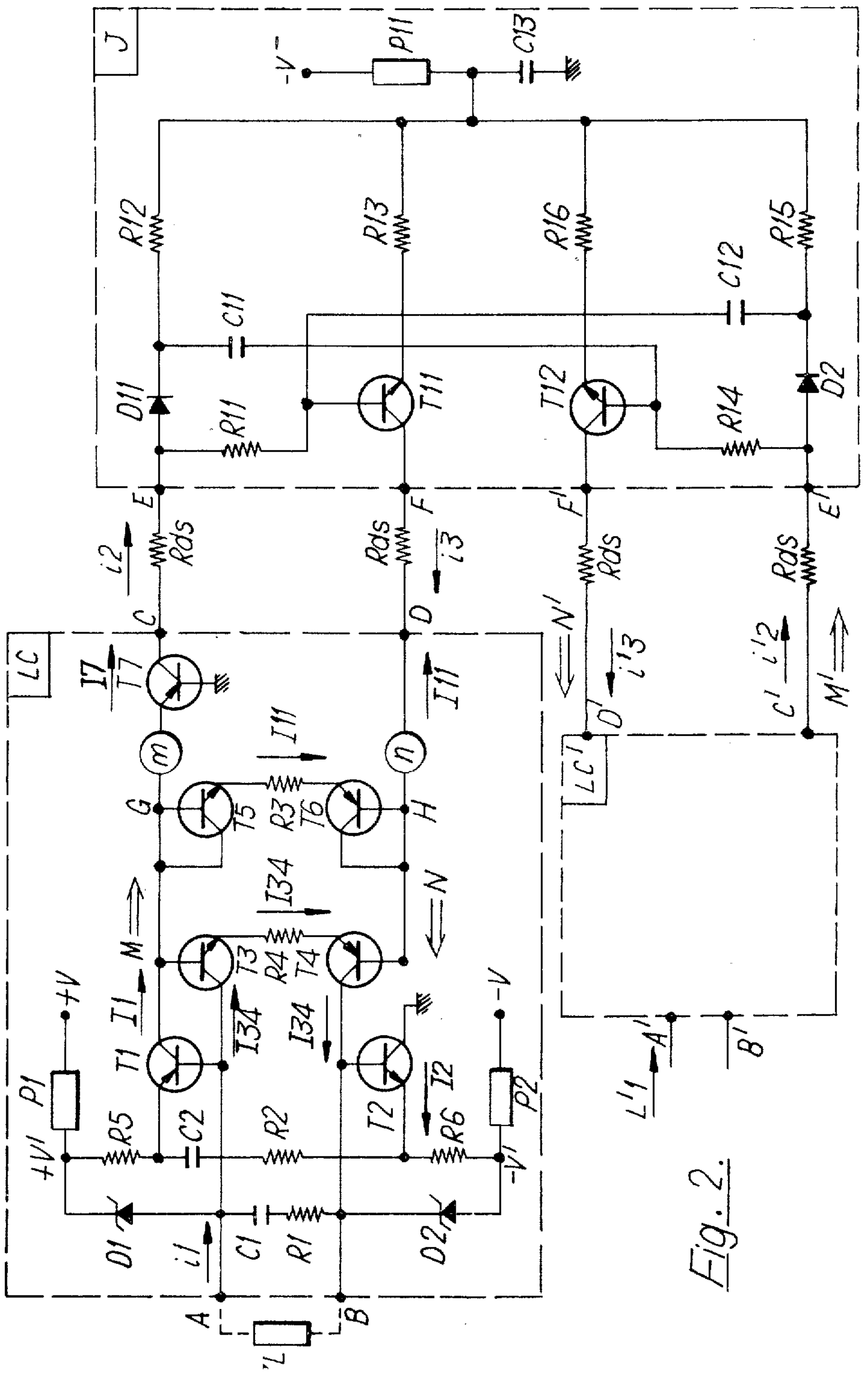
FIG. 2 represents the detailed diagram of a conversion circuit and of the associated half-junctor.
Figure 5:
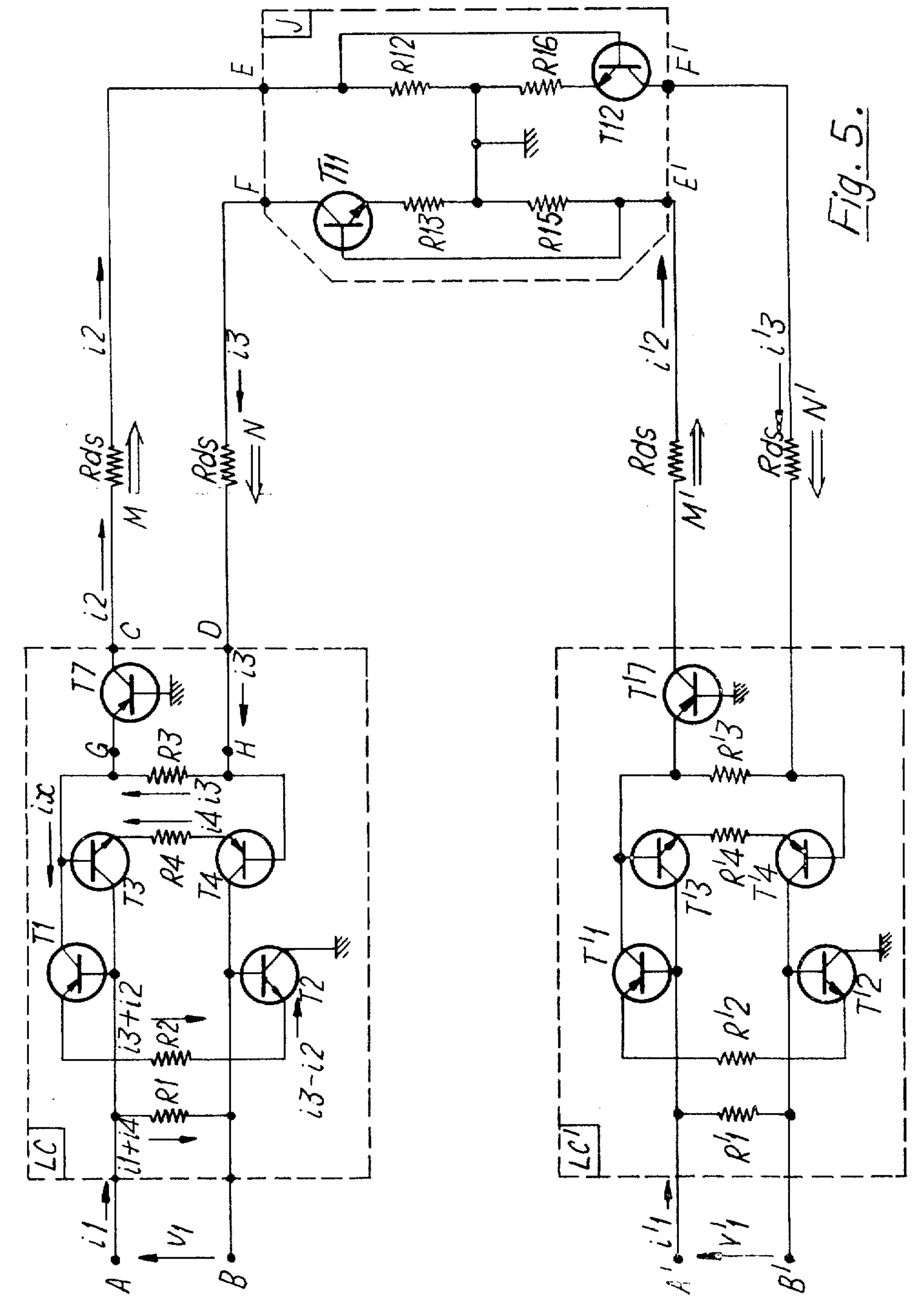
FIG. 5 represents the diagram of the AC transmission path.

In this figure, as in the FIGS. 2 and 5, the symbol "  " indicates the propagation direction of the current modulated information signals.

FIG. 2 represents the detailed diagram of the conversion circuit LC and of the junctor J which are supplied by a voltage difference 2V established by the voltage sources V and −V. These sources are connected to the circuits through electronic dipoles, or gyrators P1, P2, P11 identical to those described in the French Pat. Application No. 71 25013 (corresponding to U.S. Pat. No. 3,778,734), the nature and operation of which is reviewed in, the nature and operation of which is reviewed in paragraph 4, below.

The main components of the conversion circuit LC are:

The complementary differential amplifier with AC emitter feedback comprising the transistors T1, T2. The differential connection and the AC feedback are obtained by the resistor R2 and by the capacitor C2 connecting the emitters of the transistors. In DC operation, each transistor is connected as a constant current generator as its base-to-emitter voltage is defined by one of the Zener diodes D1, D2. These diodes D1, D2 are identical and the resistors R5, R6 have the same value so that identical constant currents I1 and I2 flow through the two transistors. This amplifier is used to transmit information signals in the direction M while achieving the two-wire to four-wire conversion;

The complementary differential amplifier with emitter feedback comprising the transistors T3, T4 and the emitter resistor R4. The DC current I34 which flows through this amplifier is directly supplied through the Zener diodes D1 and D2. It is used to transmit the information signals in the direction N while achieving the four-wire to two-wire conversion;

The circuit which distributes current I1 between the conductors *m* and *n*. A part I7 of this current flows through the conductor *m* into the current sink −V, in the junctor J. The remaining part I11 flows through the transistors T5, T6 connected as diodes and the conductor *n* and it is also absorbed by the sink −V.

The junctor J comprises two identical circuits, which for convenience of identification, are referred to hereinafter as half-junctors interconnected, in AC, by the capacitors C11 and C12. The half-junctor which cooperates with the circuit LC (LC′) comprises the transistor T11 (T12), the diode D11 (D12) and the resistors R12, R13 (R15, R16). In AC, these resistors are grounded by the capacitor C13.

Figure 3:
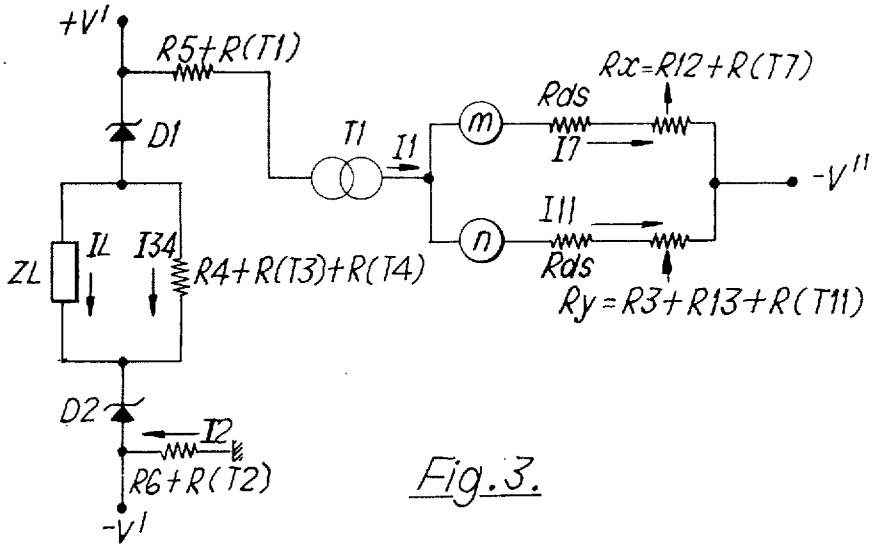
FIG. 3 represents a simplified diagram to study the distribution of the DC currents.

The FIG. 3 represents a simplified diagram, or equivalent circuit, of the whole of these circuits making it possible to more clearly determine the distribution of the DC currents in the different branches. In this diagram, the output voltages of the electronic dipoles are referenced V, −V and −V″. Besides, the equivalent resistance of a transistor, such as T1, has been referenced R(T1). It will be understood that such a resistance is equal to the ratio of the collector-to-emitter voltage to the collector current.

This figure shows the following currents:

Currents IL and I34 which flow respectively through the line impedance ZL and the differential amplifier T3-T4;

Current I1 delivered by the current generator T1;

Current I7 and I11 such as I7 + I11 = I1;

Current I2 supplied by the transistor T2 and which is used for balancing the currents supplied by the voltage sources V′ and V″.

DC OPERATION

We will first study the DC operation of the circuits of FIG. 2, being admitted that, in each transistor, the emitter and the collector currents are equal and that the base current is negligible with respect to said currents. It is known that the errors due to these approximations are negligible (1 percent for hfe = 100).

It will be noticed that the resistors R1 and R2 are connected in series with the capacitors C1 and C2 so that they do not have any effect on the DC operation.

As previously seen, the sources V and −V supply on one hand the constant currents I1 and I2 and on the other hand the currents I34 and IL, this last current depending on the value of the line impedance ZL. As the dipoles have an internal resistance which is not negligible (see paragraph 4) the voltages +V′ and −V′ are not constant. However, the voltage Vz across the terminals of the Zener diode D1 is constant and it is used as the base-to-emitter voltage of T1. Therefore, a constant current I1 = Vz/R5 flows through this transistor. It is therefore understood that a constant current I34 flows through the differential amplifier T3-T4. The value of the resistor R4 is chosen such as the transistors have a suitable dynamic operation range for the expected values of the impedance ZL.

Figure 4:
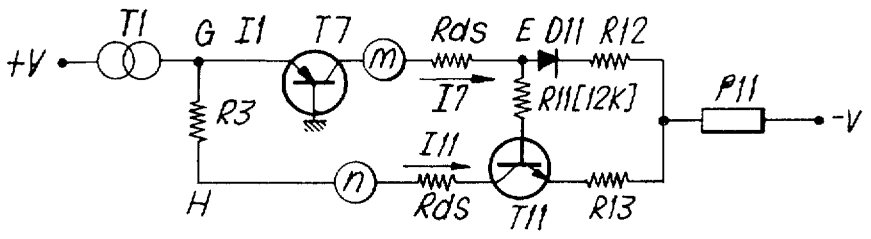
FIG. 4 represents a detailed diagram to study the distribution of the DC currents.

The greater part of the current I1 is shared between the conductors *m* and *n* according to the diagram of the FIG. 4 in which the transistors T5, T6 in diode configuration have been omitted. It is supposed that the voltage drops in the diode D11 and in the base-to-emitter diode of T11 are equal. It is then seen that:

The voltage at the point E with respect to the common point of R12 and R13 is VE = (R12) (I7);

The emitter current of T11 is I11 = (R12) (I7)/R11/hfe + R13 or $$I7/I11 = R11/hfe + R13/R12 .$$

Each one of the conductors *m* and *n* being respectively assigned to one of the transmission directions M and N of the information signals, it is desirable to have: I7/I11≈1. We must also have, in AC, R12 = R13.

In order that the currents I7 and I11 be equal, we must have R11/hfe + R13 ≈ R12. To obtain this relation, it is sufficient that, in DC, R12 be greater than R13 by a quantity R11/hfe. This can be obtained by connecting, between the point E and the diode D11, either an extra diode or a resistor shunted by a capacitor.

These currents I7 and I11 which flow through the conductors *m* and *n* are modulated, as it will be seen hereunder, by the information currents respectively referenced *i*2 and *i*3. To have a correct operation of the circuit it is sufficient to supply it under a voltage difference 2V such that, the resistors Rds being taken in account, the collector-to-emitter voltages of the transistors T7 and T11 be high enough to handle the dynamic range of the information signals.

By way of a non limitative example, we have chosen I1=I2=10mA, I7=i11 ≈ mA with +*V*=18 volts and −*V*=18 volts. One can set Rds < 600 ohms.

The two half-junctors have, for their currents I7 and I11, a common sink at the voltage −V through the same dipole P11 by-passed by the capacitor C13.

AC OPERATION

FIG. 5 represents the AC diagram of the path established between two subscriber's sets. It comprises, as in FIG. 2, the conversion circuits LC, LC′, the junctor J constituted by the association of two half-junctors, and the path through the switching network via the resistors Rds.

If this diagram is compared with the diagram of the FIG. 2, one sees that the following components have been suppressed:

The resistors R5, R6 and the Zener diodes D1, D2: actually, the dipoles P1 and P2 present a high AC impedance so that the points A and B are insulated from the ground. Besides, the base-to-emitter region of the transistors T1 and T2 is shunted by the Zener diodes the impedance of which is practically equal to zero so that no AC voltage may appear across the terminals of R5 and R6;

The transistors T5 and T6 in diode configuration and which present a negligible impedance;

The capacitors C1, C2, C11 and C12;

The resistors R11 and R12.

We will now study the AC operation of the conversion circuit being admitted that:

A current is injected at the input of the circuit LC;

The output information of the conductor *m* is a current i2 supplied by the current generator constituted by the transistor T7;

The input information on the conductor *n* is a current i3 supplied by the current generator constituted by the transistor T11.

In this study, it will be supposed that the chosen transistors have a very high current gain in common emitter configuration (hfe>100). The simplified computation allows then to consider that, as in DC operation:

The emitter and collector current of a transistor are equal;

The base circuit of a transistor does not draw any current.

THE PARAMETERS OF THE CONVERSION CIRCUIT

The impedance ZAB seen across the terminals A and B of the conversion circuit is constituted by the parallel connection of the following resistors and impedances:

Resistor R1;

Input impedance of the differential amplifier T1-T2: hfe.R2 (hfe.R2) >> R1);

Output impedance of the differential amplifier T3-T4 which is very high.

We can therefore set: ZAB ≈ R1 or ZAB = *r*1.

The impedance ZGH seen across the terminals G and H on the side of the switching network can be calculated in a similar way and we get: ZGH ≈ R3 or ZGH + *r*3.

We will now define the currents which flow through the resistors R1 to R4.

A current *i*2 flows through the transistor T7 and a current i3 flows through the resistor R3. (As seen hereabove, the fraction of the current *i*3 drawn by the base of T4 is neglected).

At the current node G we have " $ix + i2 - i3 = 0$, or $ix = i3 - i2$. This current ix flows to the ground through the transistor T1, the resistor R2 and the transistor T2.

If we suppose that a current i4 flows through the transistor T3, the resistor R4 and the transistor T4, we can write that the voltage between the bases of these transistors is equal to the voltages between their emitters, thus $R4(i4) = r3(i3)$ which gives $$i4 = r3\ (i3)/R4 \qquad 1.$$

The current *i*1 injected in the circuit LC and this current *i*4 are added in the resistor R1.

The voltage across the terminals A and B is therefore: $v1 = r1\ (i1+i4)\ (2')$.

THE BASIC EQUATIONS OF THE LINE CIRCUIT

The voltage v1 is applied at the bases of T1-T2 and is also present across the terminals of R2, which gives: $v1 = R2\ (i3 - i2)\ (2'')$.

Moreover, we have shown hereabove that this voltage appears across the terminals of *R*1, thus: $v1 = r1\ (i1 + i4)\ (2'')$.

By combining this equation with the equation (1), we get:

$$v1 = r1\ (i1 + i3\ r3/4) \qquad 3.$$

By equalizing (2'') and (3) we get:

$$R2i3 - R2i2 - r1i1 - r1i3\ r3/R4 = 0$$

$$R2/r1\ i3 - R2/r1\ i2 - i1 - i3\ r3/R4 = 0$$

$$i1 + R2/r1\ i2 + i3\ (r3/R4 - R2/r1) = 0.$$

Let us suppose that the resistors are chosen such as $R2/r1 = r3/R4 - R2/r1 = 1 \quad 4$ (which means $R2/r1 = 1;\ r3/R4 = 2$)

we get $i1 + i2 + i3 = 0 \quad 5$ with $v1 = R2\ (i3 - i2)\ (2'')$; $v1 = r1\ (i3 - i2) \quad 2.$ The couple of equations 2 and 3 defines the input circuit operation.

It will be noticed that, in the equation (4), we can choose resistance values such that their ratio is different from unity. In this case, the line circuit operates like a symmetrical transformer having a transformation ratio different from 1.

THE TRANSFER CHARACTERISTIC

We will now study the transfer of signals between the circuits LC and LC', designating by *i'*1, *i'*2, i'3 the currents flowing in the circuit LC'. These currents have, on the FIG. 6, the same directions as the homologous currents in the circuit LC.

These two circuits LC and LC' are connected through the junctor J wherein we have only represented its transistors T11, T12 and its resistors R12, R13, R15, R16 which have all the same value.

It results that an outgoing current from the junctor, *i'*3 for example, is equal to the corresponding incoming current *i*2. However, as the directions of these currents are the opposite of those represented on the figure, we have:

$i'3 = -i2 \quad 6.$ and also $i'2 = -i3 \quad 7.$

If we apply the equations (2) and (5) to the circuit LC', we get:

$v'1 = r1\ (i'3 - i'2) \quad 8$ $i'1 + i'2 + i'3 = 0 \quad 9.$

From the equations (2) and (8) we get $v'1 = -v1$ 10

From the equations (5) and (9) we get $i1 = -i'1$ 11.

The equations (10) and (11) show that the path established between the circuits LC and LC' through the junctor J transmits the AC signals in amplitude and in phase. This characteristic of "transparency" is true for complex or not complex, generating and receiving, impedances connected to the terminals A, B and A', B'.

ANALYSIS OF THE "HYBRID" FUNCTION OF THE CONVERSION CIRCUIT

In the above description we did not take into account the reflections of one transmission direction on the other. Thus we shall now study how the circuits operate when a generator and a signal receiver are respectively connected to the terminals A, B and A', B' and conversely (FIG. 5).

SIGNAL GENERATOR CONNECTED TO THE TERMINALS A, B

We suppose that a generator of e.m.f. v1 and internal impedance ZL is connected to the terminals A, B and that a receiver of impedance ZL is connected to the terminals A', B'. The transmission direction of the information is *M* and we have $i3 = 0$.

From the equations (1) and (4), only the current $i1$ flows through the resistor $R1$ and we have: $v1 = (R1)(i1)$.

This voltage is also present at the terminals of R2 thus: $v1 = R2\ (i2)$ (see equation 2'').

As $R1 = R2$ we have $i1 = -i2$.

This current $i2$, supplied by the current source T7 is injected in the junctor J in which the values of the resistances are:

$R12 = R13 = R15 = R16 = 300$ ohms;

$R11 = R14 = 12$ kilohms.

Figure 6:
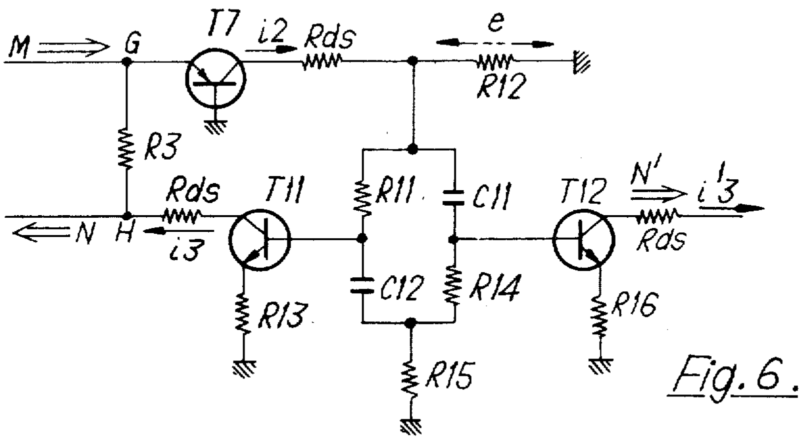
FIG. 6 represents the diagram of the circuits affected by the reflection of the signals.

A part of the current $i2$ is reflected in the circuit LC and the FIG. 6 represents the circuits concerned by this reflection.

In the junctor J, this current $i2$ divides between the resistor R12 and the circuit comprising the components R11, R14, R15, C11 and C12. As the impedances of C11 and C12 have been chosen negligible at the signal frequency, this circuit derives about 5 percent of the current $i2$ so that the voltage at the terminals of R12 is: $e = (0.95)\ R12(i2)$.

This voltage is applied, through the capacitor C11, at the base of the transistor T12 and appears at its emitter, across the terminals of R16, so that: $-i'3 = (0.95)i2$. On the other hand a part R15/R11 + R15 (or 2,5 percent) of this voltage $e$ is applied at the base of the transistor T11 which thus supplies a reflection current in the direction N of amplitude $i2(r) = (0.95)(0.025)i2 \approx 0{,}025.i2$. This current is reinjected at the point G in the conductor $m$ in phase opposition with the current $i2$, causing another reduction of the current $i3$, but this time of a very small amplitude. If it is necessary, this reduction can be balanced by increasing the value of R12 or of R16.

SIGNAL RECEIVER CONNECTED TO THE TERMINALS A, B

It is supposed that a receiver of impedance ZL, (of nominal value R1 when ideally matched) is connected between the terminals A, B and that a current $i3$ is injected in the circuit LC. One understands that, generally ZL $\neq$ R1.

The transmission direction of signals is the direction N. According to the equation (1), we have $i4 = 2i3$, and this current returns to the circuit constituted by the parallel connection of ZL and R1.

We will now study the operation of the circuit LC according to the matching of impedances ZL and R1.

a. Perfect matching with ZL = R1: a current of value $i3$ flows through each of the impedances R1 and ZL and the voltage difference between the terminals A and B is $v1 = (R1)\ i3$ 12.

As R1 = R2, the equations (2'') and (12) give: $i3 - i2 = i3$ and therefore $i2 = 0$.

It is thus seen that, for a perfect impedance matching the receiver does not bring any reflection from the direction N on the direction M;

b. First limit case of impedance mismatch with ZL = 0: This case corresponds to a short-circuit between the terminals A and B. We have then $v1 = 0$ and the equation (2'') gives: $i2 = i3$.

It is thus seen that, if the input terminals A, B, are short-circuited, there is complete reflection from the direction N on the direction M;

c. Second limit case of impedance mismatch with ZL $= \alpha$: this case corresponds to the disconnection of the receiver. Then a current $2i3$ flows through the resistor R1, thus $v1 = (2R1)\ i3$ and the equation (2'') gives $i2 = -i3$.

It is thus seen that, in open circuit operation, there is a total reflection from the direction N on the direction M, but the reflected signals are of opposite phase with respect to those reflected in the short-circuit case.

One understands that, for the intermediate mismatch cases, the reflection current varies between 0 and $\pm i3$ which corresponds to the conventional operation of an "hybrid" circuit.

In the case when the impedance ZL is complex, the equations previously established allow to calculate the value of the couple of currents $i2$, $i3$ which achieves the analog transmission of the value of the impedance ZL through the path connecting the terminals A, B and the terminals A', B'. This transmission insures permanently the validity of the equations (10) and (11) which characterize the transparency of said path.

THE ELECTRONIC DIPOLE

Figure 7:
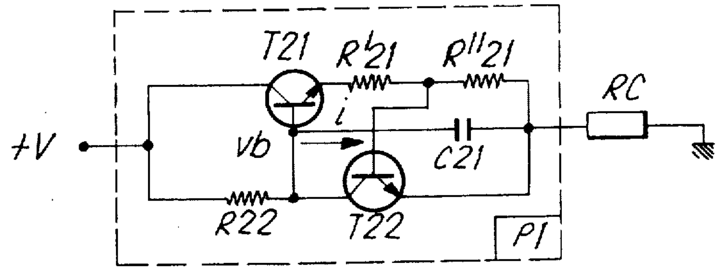
FIG. 7 represents the diagram of the gyrator or electronic dipole.

The FIG. 7 represents the diagram of the current-limited gyrator circuit limitation or "electronic dipole" according to the French Pat. application No. 71 25013 (corresponding to U.S. Pat. No. 3,778,734). This dipole connects each conversion circuit (P1, P2, FIG. 2) and each junctor (P11) to the voltage sources $+V$ and $-V$. Each of them makes the following operations:

DC supply of the circuits with an impedance as low as possible;

Minimization of the crosstalk between lines and between junctors;

Protection against short-circuits on the subscriber's loop.

The diple P1 represented on the figure comprises two distinct circuits:

The gyrator circuit comprising the transistor T21, the resistors R''21, R'21, R22 and the capacitor C21;

The current limitation circuit comprising the transistor T22.

DC OPERATION

If we take into account all the components of the gyrator, except the capacitor C21, the current flowing through the transistor T21 is: $Ic = V/r + Rc$ with $r = R21 + R22 + hie/hfe$ (hfe is the input impedance of the transistor in common emitter configuration and R21 = R'21 + R''21).

If we set, as an example, $r = 200$ W and V = 20 volts, the short-circuit current of the dipole (case when Rc = 0) is equal to 100 mA. If R21 = 100 ohms, the power dissipated in the dipole is 2 watts.

If now, we connect the current limitation transistor T22, this one switches on when R''21 (Ic) > $u$, $u$ being the conduction threshold of the transistor. It then sets a constant voltage u on the emitter of T21 so that the current is limited to a value $u$/R''21. We therefore see that the circuit provides a regulation of the current Ic when R''21 (Ic) > $u$. If $u = 0{,}6\ v$ and $R''21 = 20$ W, the regulation operates when Ic becomes higher than 30 mA. The short-circuit power dissipated in the dipole is then about 0,6 watt, which is a value three times lower than in the previous case.

In this circuit, the value of R21 is set by the limit value of the current. The internal impedance r of the dipole can however be reduced by using, as transistor T21, a Darlington configuration, which gives $r \approx$(R21) R22/$hfe^2 \approx$R21.

In the French Pat. Application No. 71 25013 we have given a detailed description of the AC operation of the dipole and we have shown that:

The dipole operates as a gyrator circuit with an equivalent inductance of value L = R22(C21)(R21) + *hie/hfe*);

The dipole presents, in the medium frequency range (1 to 100 kHz), an equivalent resistance constituted by the parallel connection of the resistor R22 and of a resistor of value 1/hoe . (1 + hfe/1 + hie/R21).

We see that these two parameters are relatively independent from the parameters of the transistor T21.

While the principles of the above invention have been described in connection with specific embodiments and particular modifications, thereof it is to be clearly understood that this description is made by way of example and not as a limitation of the scope of the invention.

We claim:

1. An electronic two-wire to four-wire conversion circuit, comprising a switching network, a path through said switching network having a given resistance, a pair of line terminals for receiving a first variable voltage from a subscriber line for transmission of information signals in a first direction away from the subscriber line and for receiving a second variable voltage for transmission of information signals in a second direction toward the subscriber line, a pair of network terminals connecting the switching network to a junctor via two conductors of the switching network respectively assigned to the first and second directions of transmission, the information signals transmitted on said conductors being carried by modulation of a first current in the first direction and by modulation of a second current in the second direction, means including a resistor and a capacitor coupled in series between the line terminals, a pair of intermediate terminals coupled between the line terminals and the network terminals, means including a resistor interconnecting the intermediate terminals, a first complementary differential amplifier coupled between the line terminals and the intermediate terminals, a first current generator coupled between a first one of the intermediate terminals and a first one of the network terminals, means providing a common connection between a second line terminal and a second intermediate terminal, whereby for information signals, current mode operation is set on the network side at the network terminals in the first direction by loading the first current generator with a first resistor and, in the second direction, by supplying a second current from a second current generator connected via a second resistor and the second network terminal to the second intermediate terminal, said second resistor being selected to have a value equivalent to the resistance of the path through the switching network.

2. The invention according to claim 1 in which, for transmission in a first direction, the first complementary differential amplifier employs AC emitter feedback achieved by connecting the emitters of first and second complementary transistors through a resistor and a capacitor in series, the collector of the first transistor being connected to the first intermediate terminal while the collector of the second transistor is connected to ground, said amplifier being biased with DC so that constant currents of equal value flow through these transistors, and for transmission in the second direction, the intermediate terminals of the conversion circuit are connected to the inputs of a second differential amplifier with emitter feedback achieved by connecting the emitters of two complementary transistors through a resistor through which flows a constant current, and the line terminals of the conversion circuit are connected to the outputs of said second differential amplifier, said second differential amplifier completing the four-wire to two-wire conversion.

3. The invention according to claim 1 in which, for transmission in the first direction, the first complementary differential amplifier employs AC emitter feedback achieved by connecting the emitters of first and second complementary transistors through a resistor and a capacitor in series, the collector of the first transistor being connected to the first intermediate terminal while the collector of the second transistor is connected to ground, said amplifier being biased with DC so that constant currents of equal value flow through these transistors, and for transmission in the second direction, the intermediate terminals of the conversion circuit are connected to the inputs of a second differential amplifier with emitter feedback achieved by connecting the emitters of two complementary transistors through a third resistor through which flows a constant current, and the line terminals of the conversion circuit are connected to the outputs of said second differential amplifier, said second differential amplifier completing the four-wire to two-wire conversion by measuring the difference in voltage across the resistor between the intermediate terminals, the first intermediate terminal of which is at a virtual ground, said conversion circuit being equivalent to a hybrid transformer with a transformation ratio n when choosing $R2/r1 = n$ and $r3/R4 = n + 1$, $r1$ being the input impedance of the conversion circuit (equal to the parallel connection of the resistor R1 coupled between the line terminals of the input impedance of the first differential amplifier and of the output impedance of the second differential amplifier), R2 being the resistance between the emitters of the first differential amplifier, R4 being the resistance of the third resistor, and $r3$ being the impedance of the circuit seen from the intermediate terminals (equal to the parallel connection of the resistor between the intermediate terminals, of the input impedance of the second differential amplifier and of the output impedance of the first differential amplifier).

4. The invention according to claim 1, in which, said conversion circuit is coupled to supply sources by means of a plurality of gyrators.

5. The invention according to claim 1 including a first transistor circuit functioning as a gyrator circuit and a second transistor circuit functioning as a current limiter.

6. The invention according to claim 5, in which the first transistor circuit is selected to have a Darlington configuration to provide a reduction in the internal impedance of the first transistor circuit.

* * * * *